US012617464B2

(12) United States Patent
Byun

(10) Patent No.: US 12,617,464 B2
(45) Date of Patent: May 5, 2026

(54) SENSING DEVICE

(71) Applicant: LG INNOTEK CO., LTD., Seoul (KR)

(72) Inventor: Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 660 days.

(21) Appl. No.: 18/016,079

(22) PCT Filed: Jun. 30, 2021

(86) PCT No.: PCT/KR2021/008255
§ 371 (c)(1),
(2) Date: Jan. 13, 2023

(87) PCT Pub. No.: WO2022/039380
PCT Pub. Date: Feb. 24, 2022

(65) Prior Publication Data
US 2023/0264740 A1 Aug. 24, 2023

(30) Foreign Application Priority Data
Aug. 18, 2020 (KR) ........................ 10-2020-0103339

(51) Int. Cl.
B62D 15/02 (2006.01)
F16H 49/00 (2006.01)
(Continued)

(52) U.S. Cl.
CPC ....... B62D 15/0225 (2013.01); F16H 49/005 (2013.01); G01B 7/30 (2013.01); G01M 17/06 (2013.01)

(58) Field of Classification Search
CPC .. B62D 15/0225; B62D 6/10; B62D 15/0215; F16H 49/005; G01B 7/30;
(Continued)

(56) References Cited

U.S. PATENT DOCUMENTS 6,630,823 B2 * 10/2003 Tateishi ................. B62D 15/02
324/207.21
6,861,837 B1 * 3/2005 Shimizu ................. G01D 5/145
324/207.25
(Continued)

FOREIGN PATENT DOCUMENTS

JP 2007-256250 A 10/2007
JP 2019-516990 A 6/2019
(Continued)

*Primary Examiner* — Drew J Brown
(74) *Attorney, Agent, or Firm* — Birch, Stewart, Kolasch & Birch, LLP

(57) ABSTRACT

Disclosed is a sensing device comprising: a stator connected to a first shaft; a first gear rotating in engagement with the stator; a second gear rotating in engagement with the first gear; a magnet coupled to the second gear; and a magnetic element disposed corresponding to the magnet, wherein one surface of the magnet disposed facing the magnetic element has an elliptical shape. Accordingly, even when the center of the magnet disposed in the second gear and the center of the magnetic element are not aligned in the axial direction and thus arranged offset, the sensing device can enhance the precision of a steering angle measurement due to the shape of the magnet.

14 Claims, 18 Drawing Sheets

(51) Int. Cl.
    *G01B 7/30*           (2006.01)
    *G01M 17/06*       (2006.01)

(58) Field of Classification Search
    CPC ... G01B 2210/10; G01M 17/06; G01D 5/145;
               G01D 2205/28; G01L 3/105; G01L 5/221
    See application file for complete search history.

(56)              References Cited

U.S. PATENT DOCUMENTS

| | | | | |
|---|---|---|---|---|
| 8,030,917 | B2 * | 10/2011 | Hatanaka | G01D 5/145 |
| | | | | 73/514.39 |
| 8,040,130 | B2 * | 10/2011 | Chiapuzzi | G01L 25/003 |
| | | | | 73/862.331 |
| 8,203,333 | B2 * | 6/2012 | Hatanaka | G01D 5/145 |
| | | | | 324/207.25 |
| 10,215,550 | B2 * | 2/2019 | Metivier | G01B 7/30 |
| 10,823,586 | B2 * | 11/2020 | Eagen | G01D 5/245 |

| | | | | |
|---|---|---|---|---|
| 11,022,464 | B2 * | 6/2021 | Friedrich | G01D 5/16 |
| 11,255,700 | B2 * | 2/2022 | Lassalle-Balier | G01R 33/091 |
| 11,280,637 | B2 * | 3/2022 | Diaconu | G01D 5/145 |
| 2007/0194786 | A1 | 8/2007 | Hatanaka et al. | |
| 2007/0290680 | A1 * | 12/2007 | Hattori | G01D 5/145 |
| | | | | 324/207.25 |
| 2014/0210457 | A1 | 7/2014 | Ishimasa et al. | |
| 2019/0178733 | A1 | 6/2019 | Lee | |

FOREIGN PATENT DOCUMENTS

| | | | | |
|---|---|---|---|---|
| KR | 10-2009-0097378 A | 9/2009 | | |
| KR | 10-2012-0014780 A | 2/2012 | | |
| KR | 10-2012-0069869 A | 6/2012 | | |
| KR | 10-2015-0082920 A | 7/2015 | | |
| KR | 20230042004 A | * | 3/2023 | G01R 33/0011 |
| WO | WO-2007077389 A2 | * | 7/2007 | G01D 5/145 |
| WO | WO-2008053928 A1 | * | 5/2008 | G01D 5/145 |
| WO | WO-2008053939 A1 | * | 5/2008 | G01D 5/24476 |
| WO | WO 2015/125792 A1 | 8/2015 | | |

* cited by examiner

[FIG. 1]
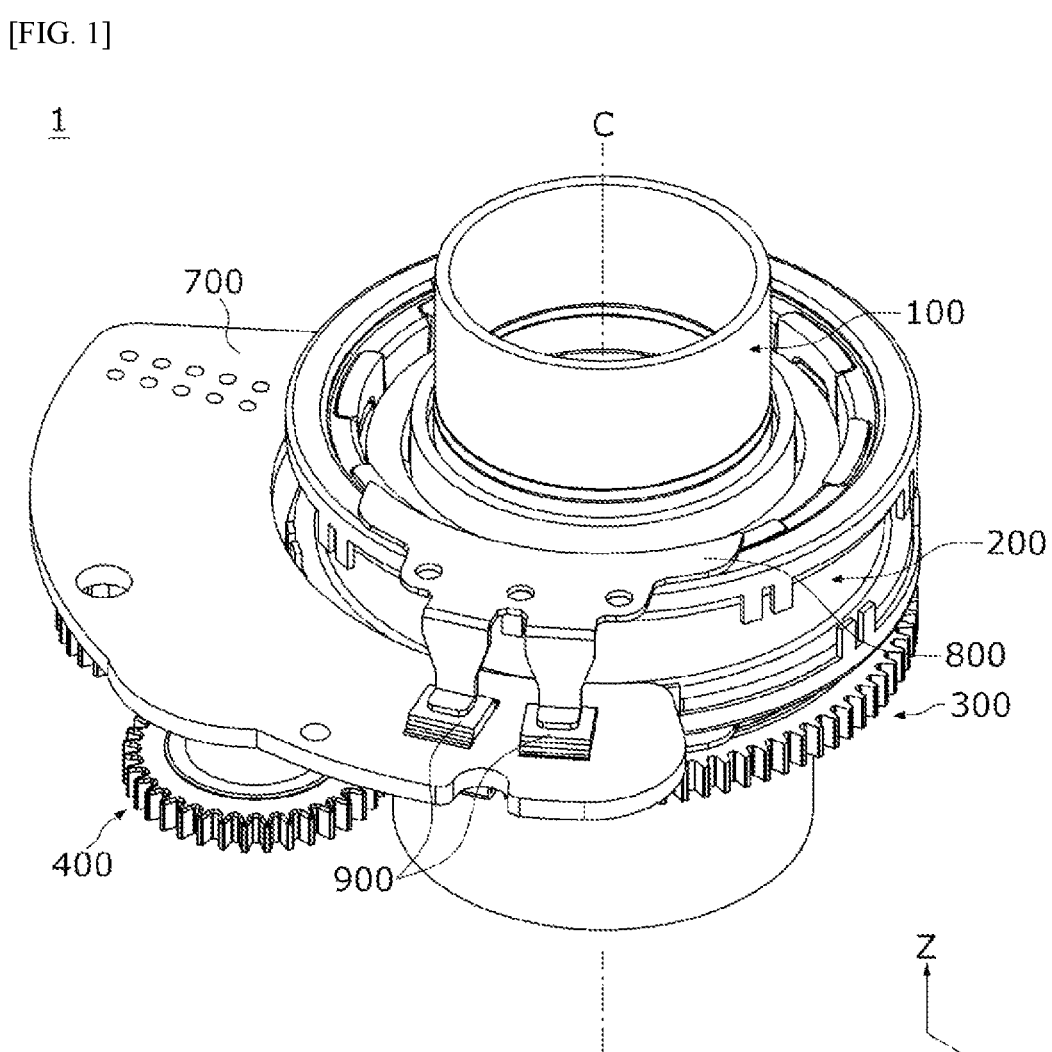

[FIG. 2]
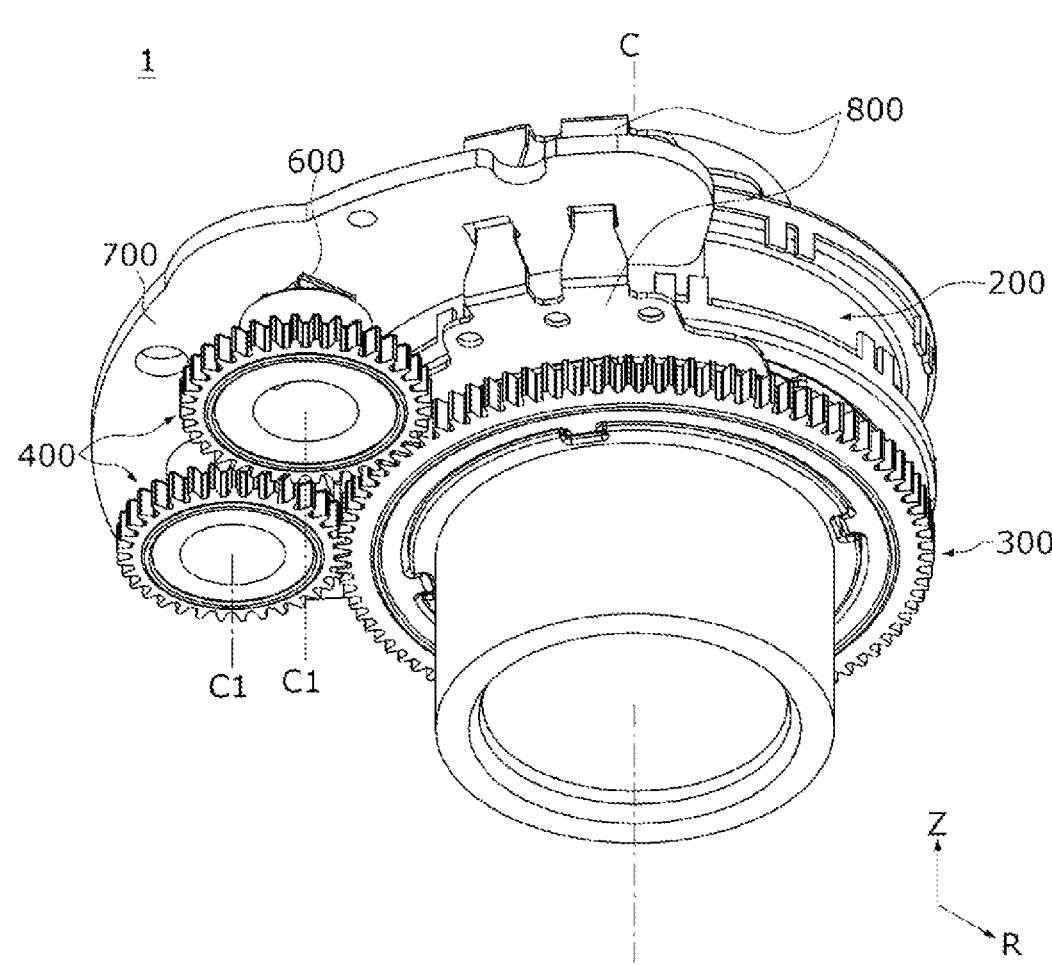

[FIG. 3]
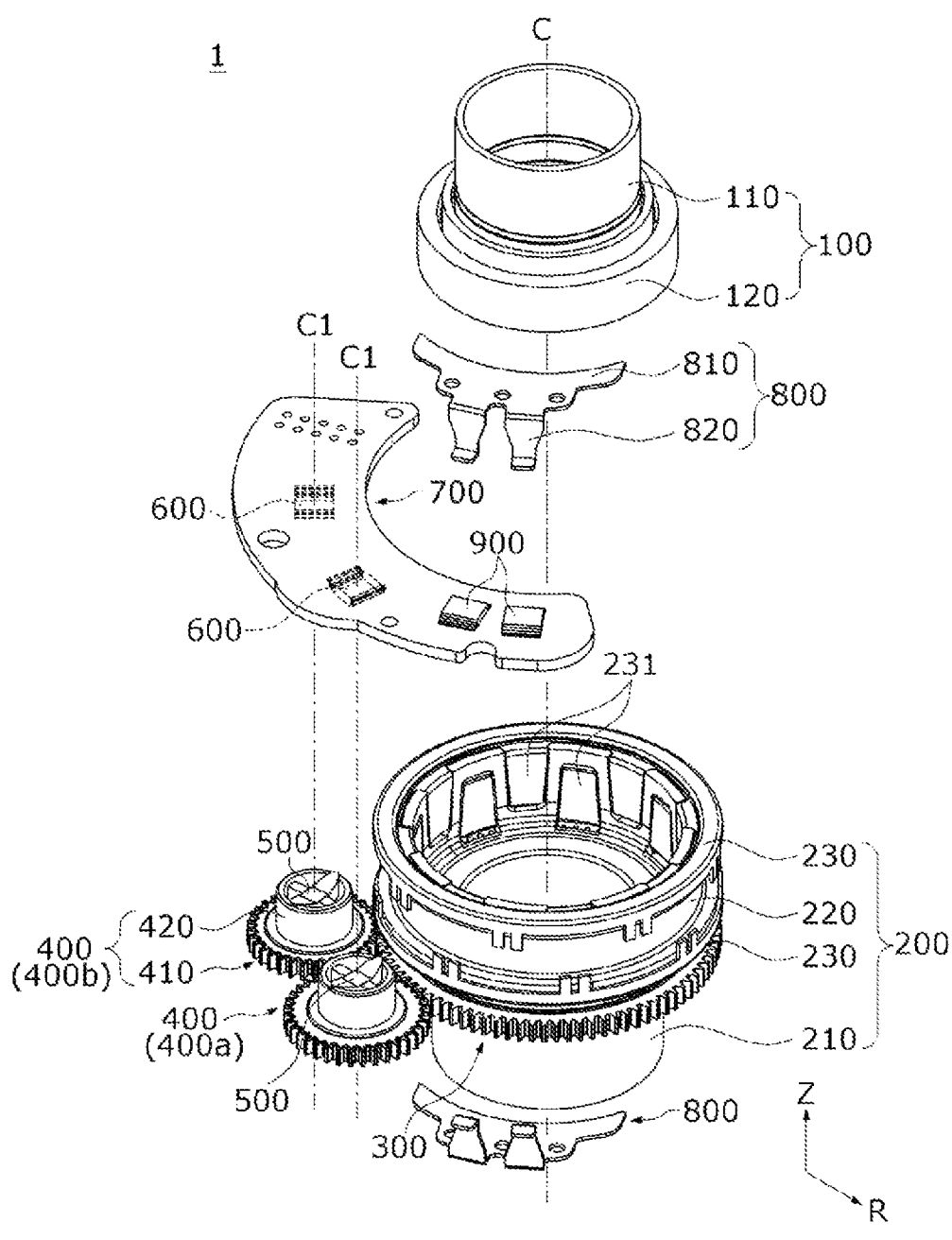

[FIG. 4]
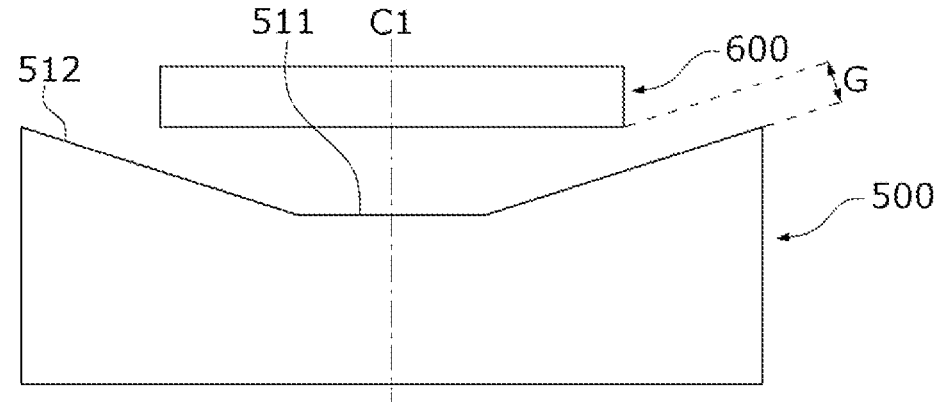
[FIG. 5]
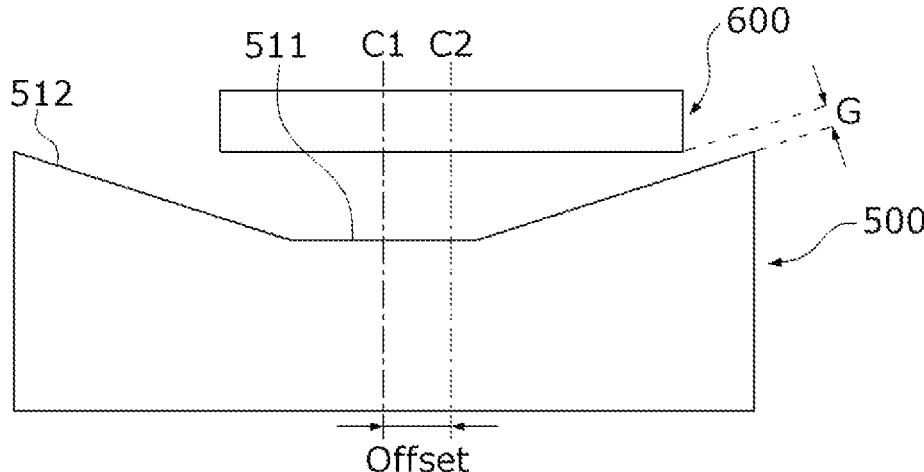

[FIG. 6]
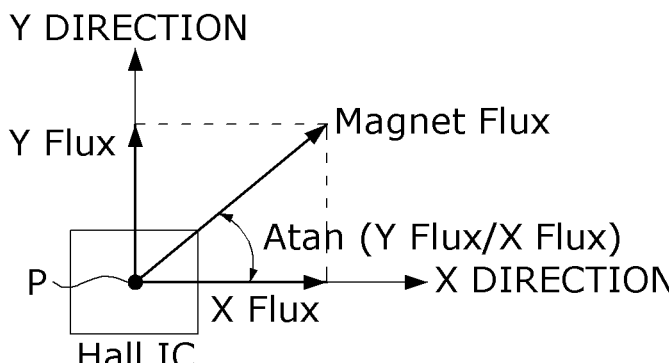

[FIG. 7]
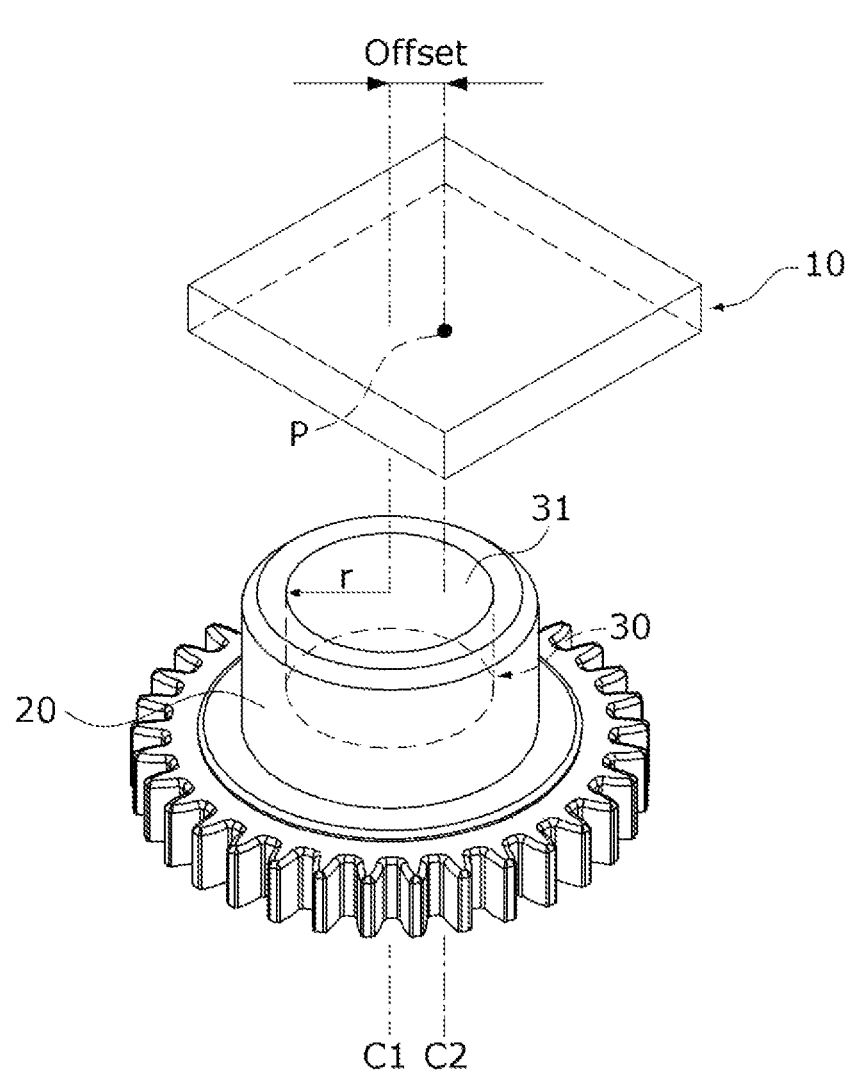

[FIG. 8]
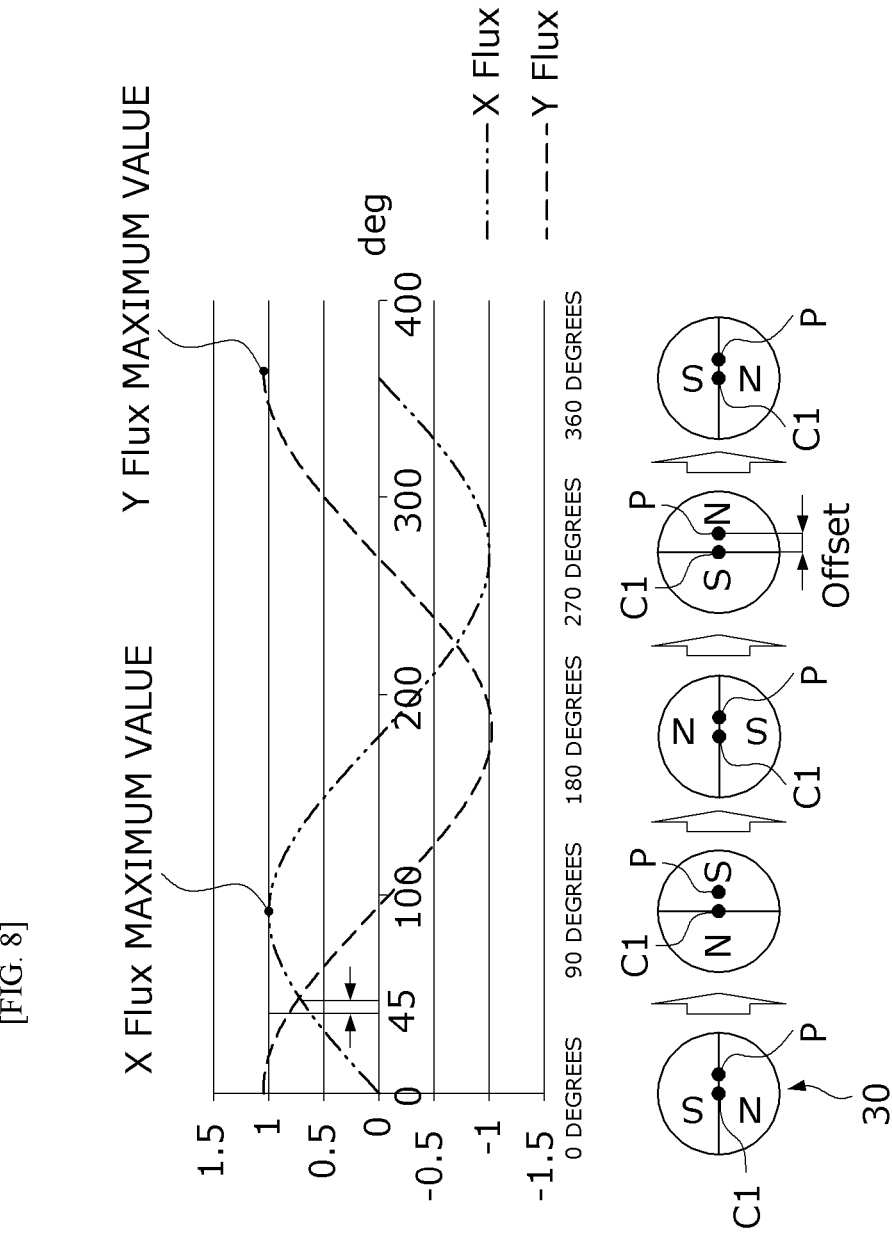

[FIG. 9]
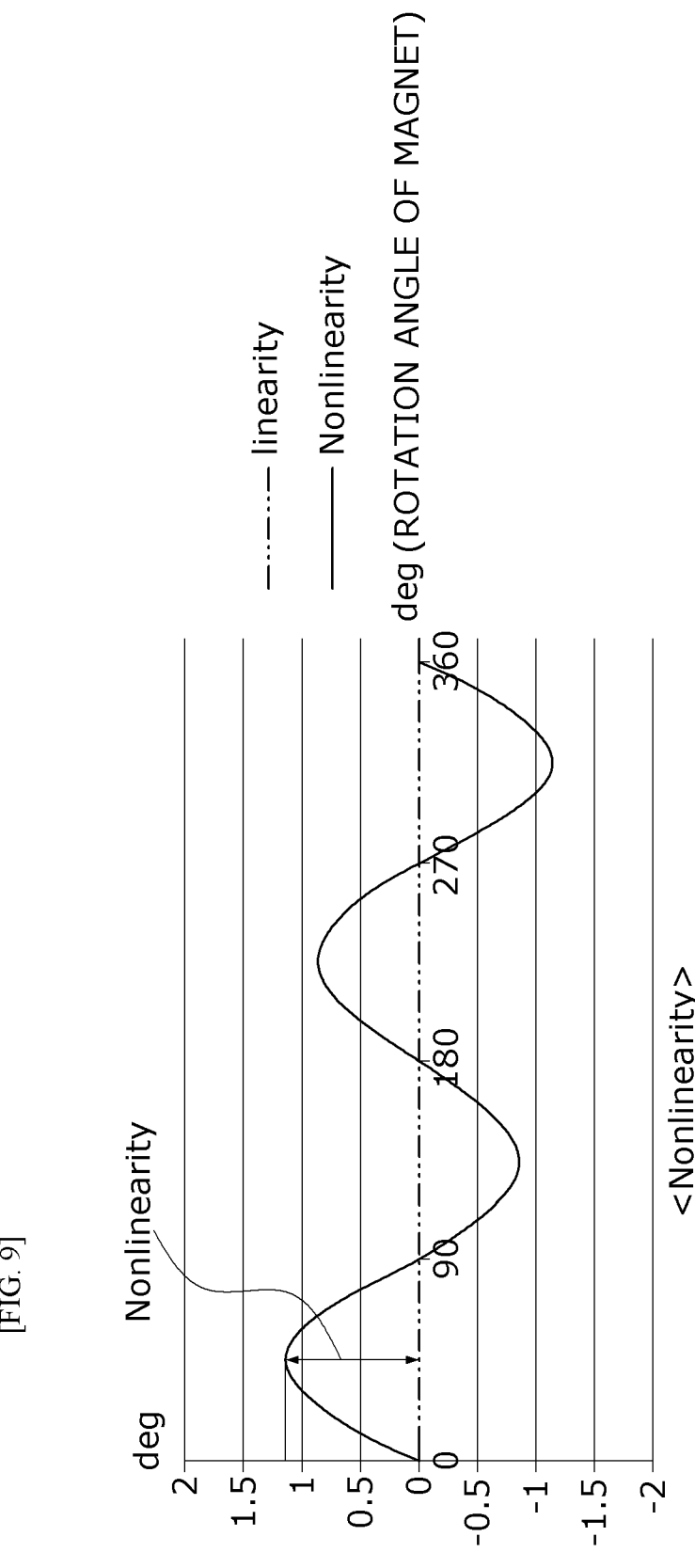

[FIG. 10]
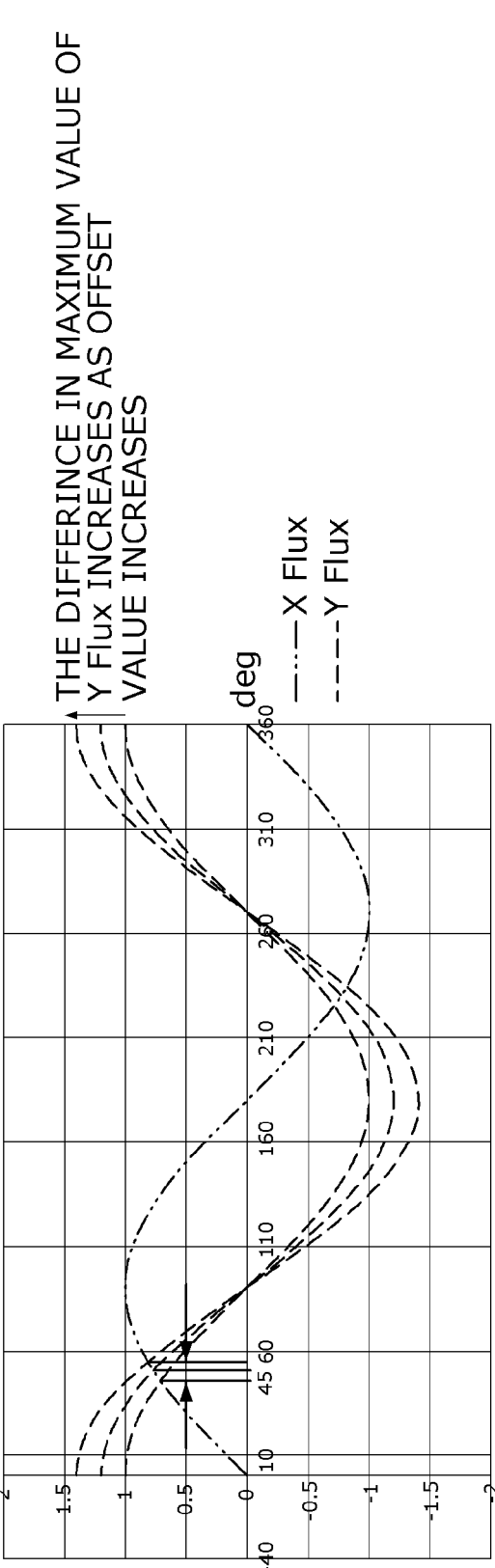

[FIG. 11]
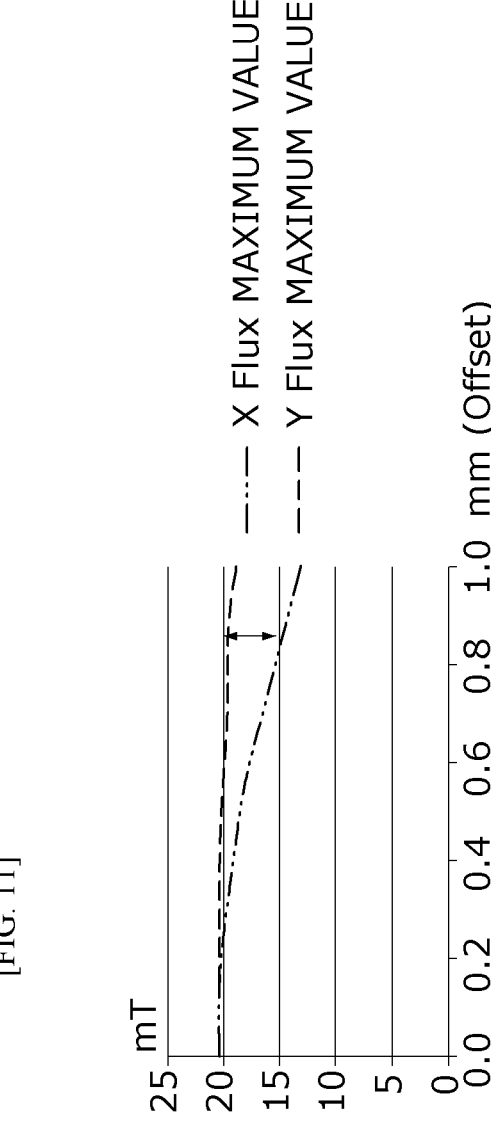

[FIG. 12]
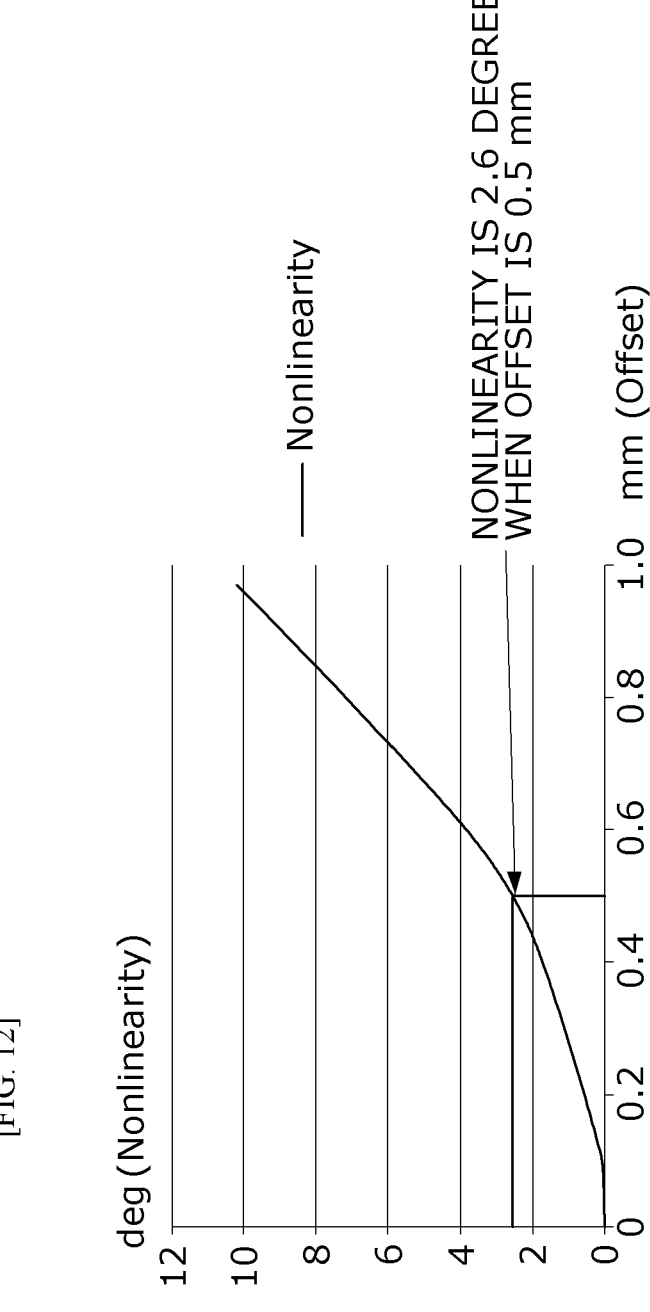

[FIG. 13]
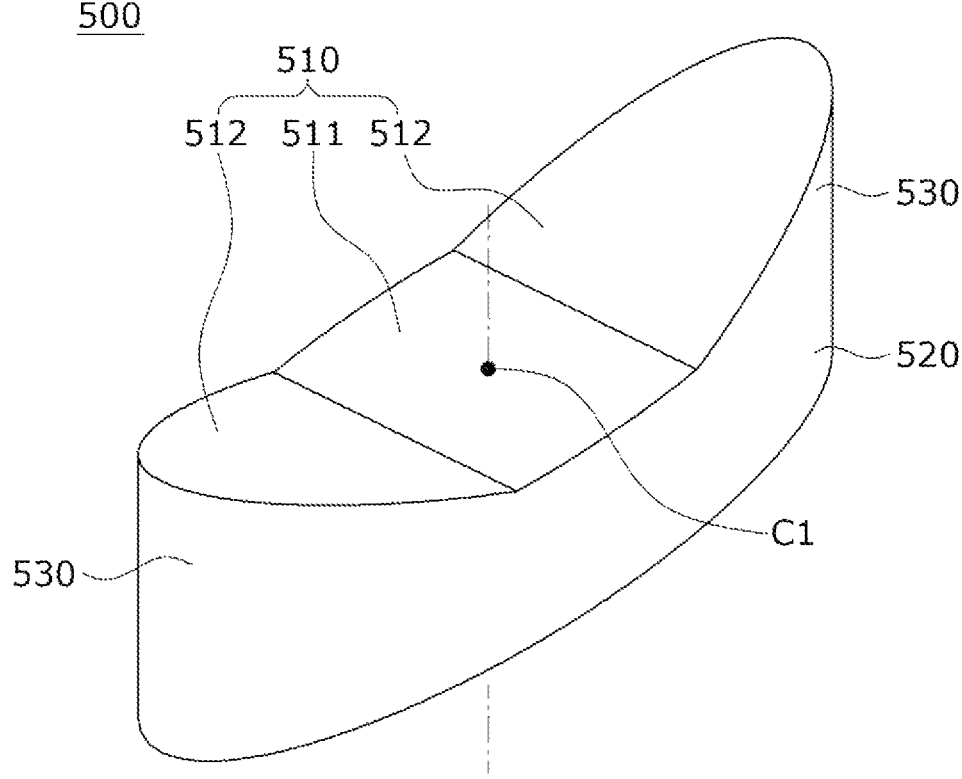
[FIG. 14]
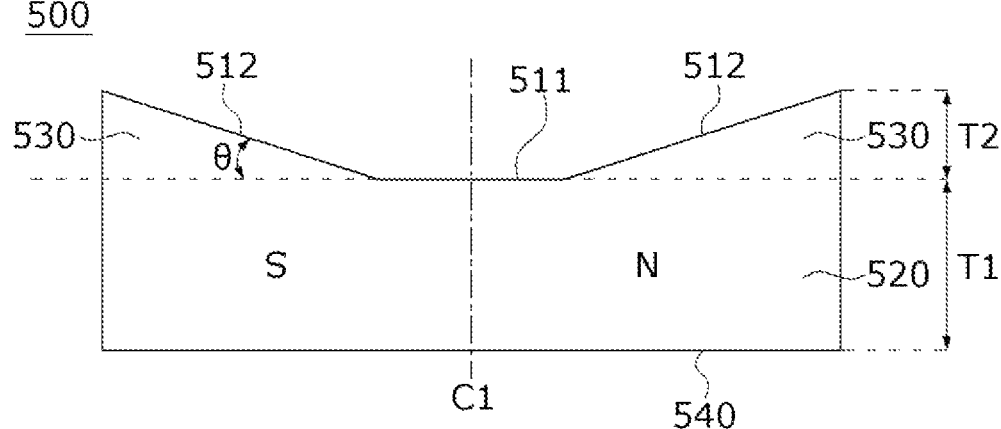

[FIG. 15]
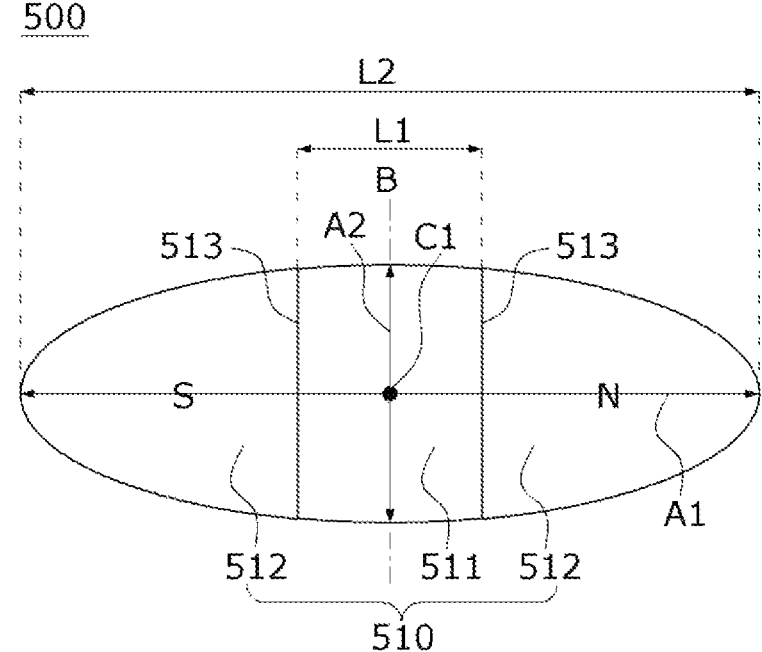
[FIG. 16]
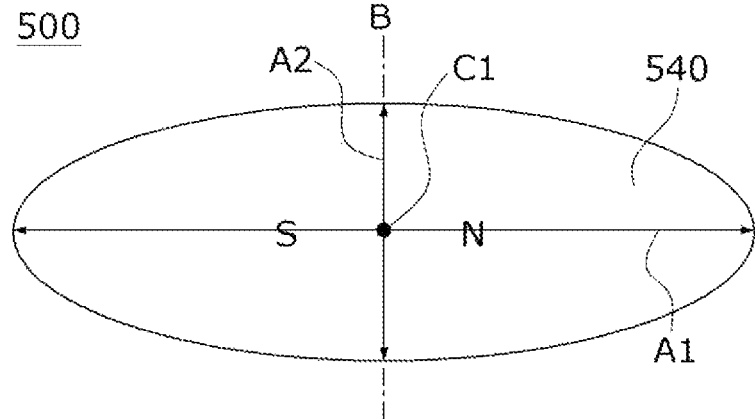

[FIG. 17]
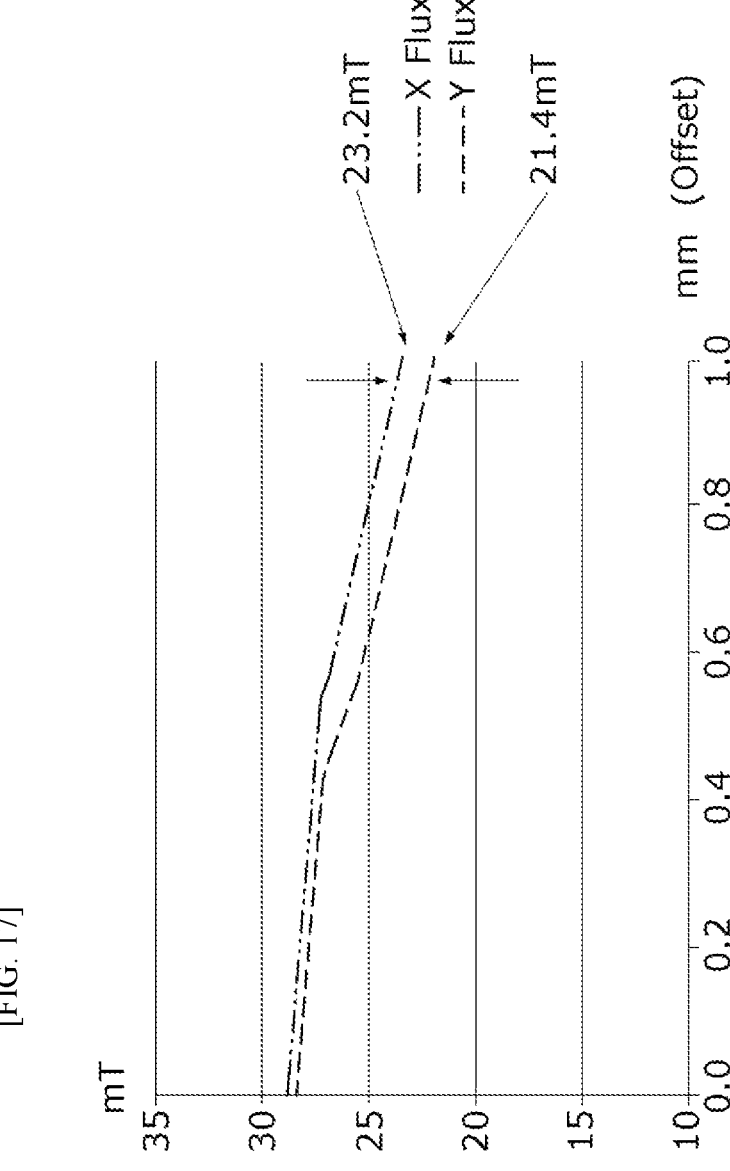

[FIG. 18]
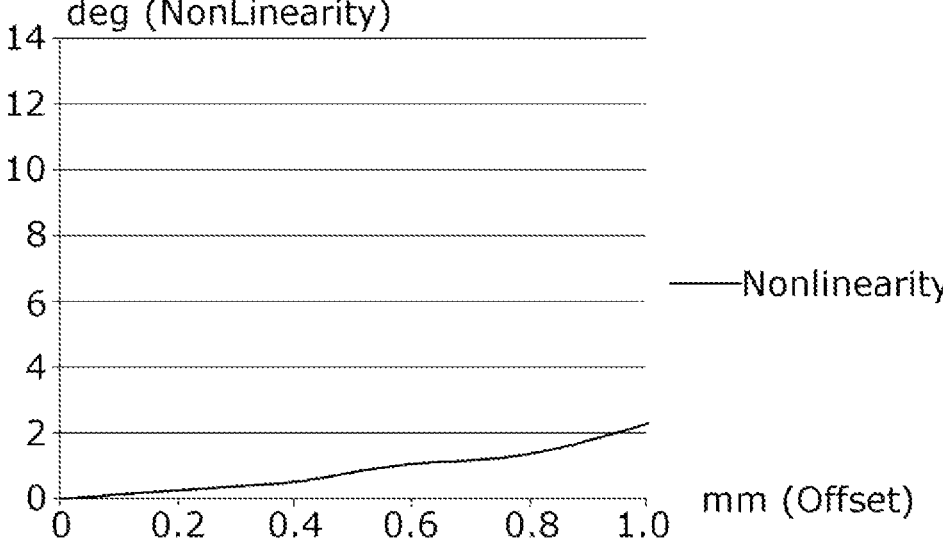
[FIG. 19]
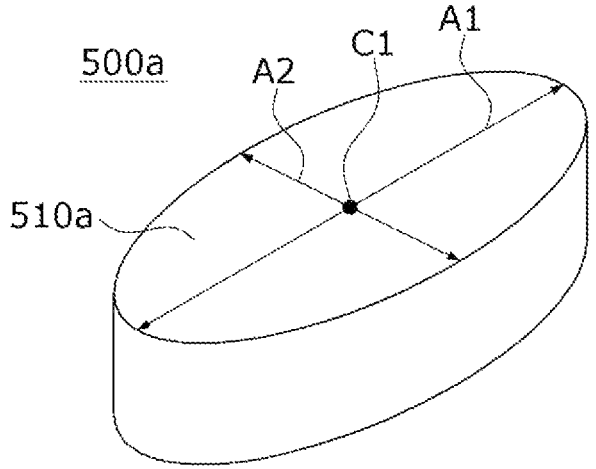

[FIG. 20]
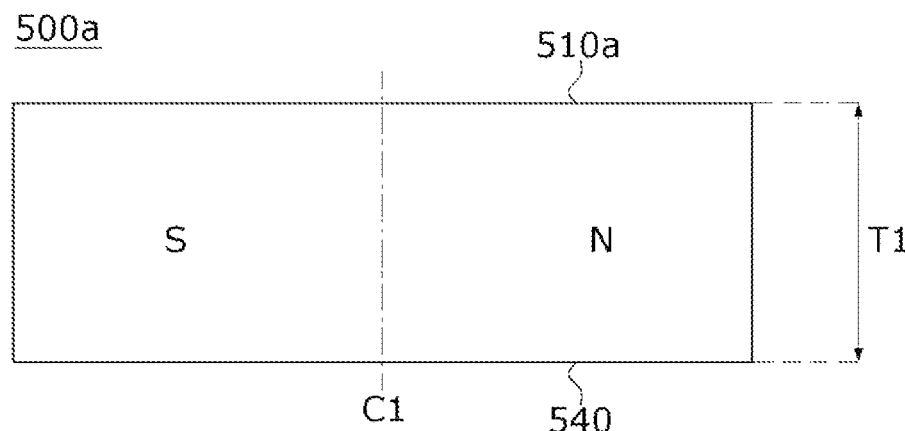

[FIG. 21]
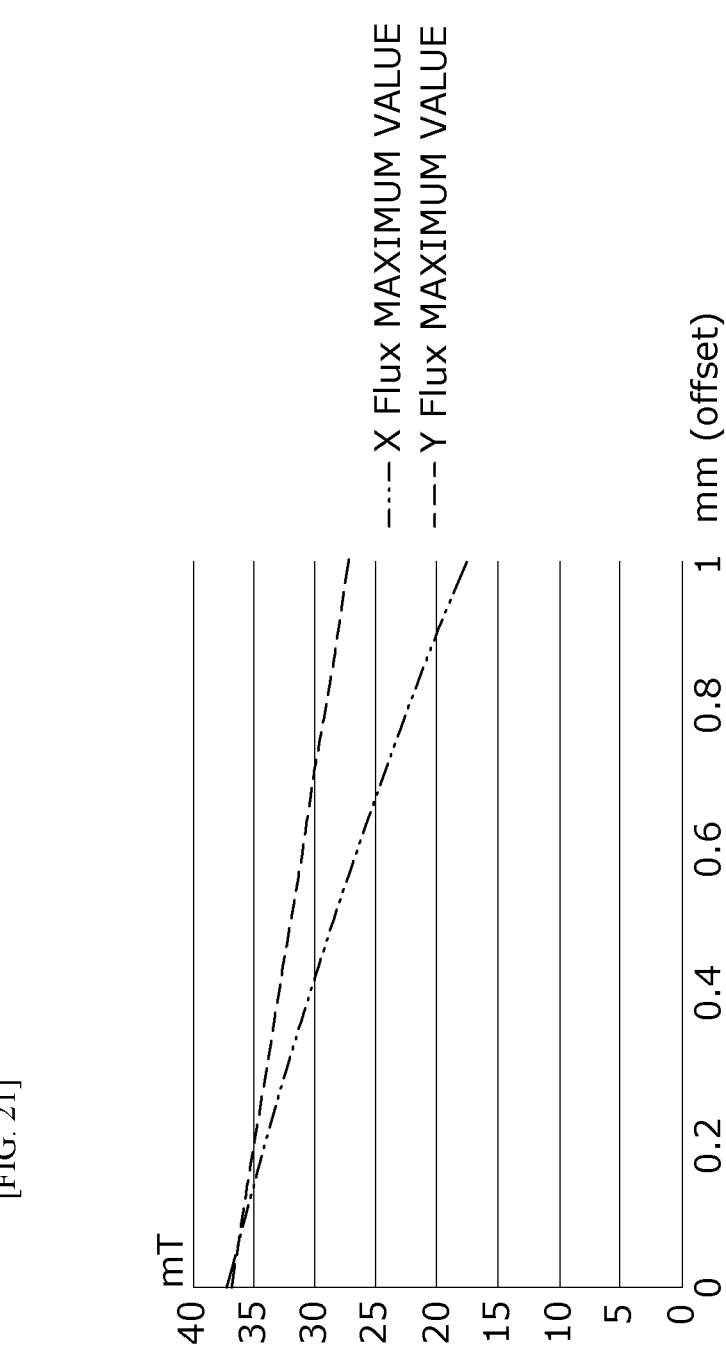

[FIG. 22]
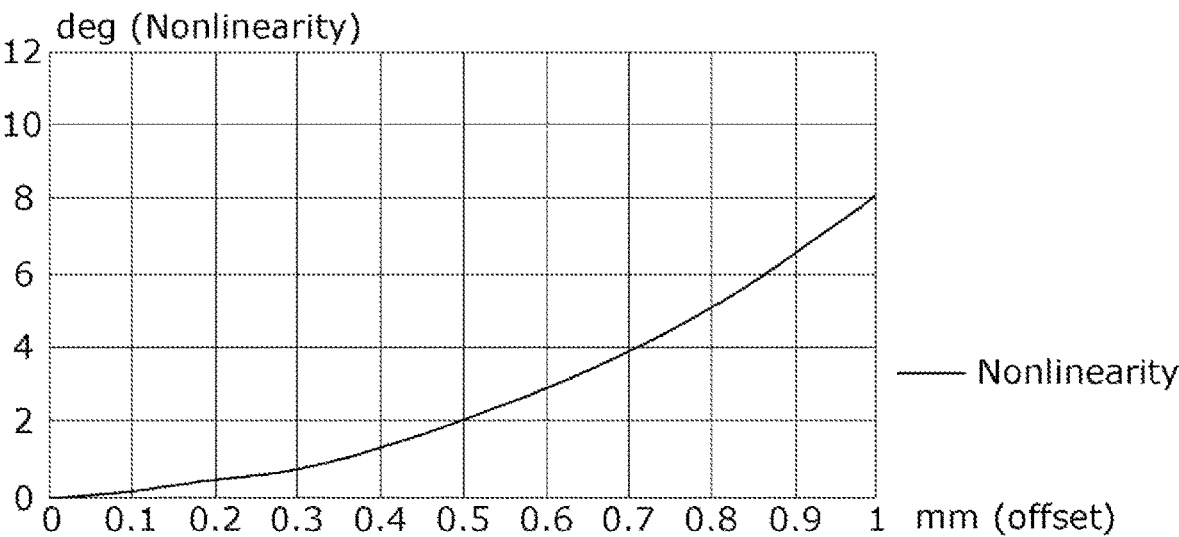

SENSING DEVICE

CROSS REFERENCE TO RELATED APPLICATIONS

This application is the National Phase of PCT International Application No. PCT/KR2021/008255, filed on Jun. 30, 2021, which claims priority under 35 U.S.C. 119(a) to Patent Application No. 10-2020-0103339, filed in the Republic of Korea on Aug. 18, 2020, all of which are hereby expressly incorporated by reference into the present application.

TECHNICAL FIELD

The present embodiment relates to a sensing device.

BACKGROUND ART

In order to secure steering stability of a vehicle, a steering system which assists steering using separate power can be used in the vehicle, and in particular, an electronic power steering (EPS) system with low power loss and superior accuracy is used.

In addition, in the EPS system, an electronic control unit drives a motor according to operating conditions and driver manipulation information detected by a vehicle speed sensor, a torque sensor, an angle sensor, and the like to secure turning stability and quickly provide a restoring force so that a driver can drive safely.

In addition, the angle sensor measures a steering angle of a steering handle using a main gear which rotates in conjunction with rotation of a rotor, a sub-gear which rotates by being engaged with the main gear, a magnet coupled to the sub-gear, and a Hall integrated circuit (IC) for detecting a change in magnetic force of the magnet.

However, when a center of the magnet fixed to the sub-gear and a center of the Hall IC disposed to correspond to the magnet are not accurately aligned, there is a problem in accurately measuring the steering angle.

That is, there is a problem that a degree of measurement accuracy of the angle sensor is degraded due to an offset generated when the center of the magnet and the center of the Hall IC are disposed. For example, due to an assembly error occurring when a substrate in which the Hall IC is disposed is installed in a case, an assembly error occurring when the sub-gear is disposed in the case, and the like, a problem that an offset is generated when the magnet and the Hall IC are disposed occurs.

In addition, when two sub-gears, two magnets, and two Hall ICs are used in an angle sensor, since an assembly tolerance is further increased, there is a problem that the reliability of a degree of measurement accuracy is also further degraded.

Accordingly, the development of a sensing device which can improve a degree of measurement accuracy of a steering angle even when an assembly tolerance of an angle sensor is generated is required.

Technical Problem

The present embodiment is directed to providing a sensing device capable of improving a degree of measurement accuracy of a steering angle even when an offset is generated when a magnet fixed to a sub-gear and a magnetic element which detects a change in magnetic field of the magnet are disposed.

Objectives to be solved by embodiments are not limited to the objectives described above, and objectives which are not described above will be clearly understood by those skilled in the art from the following descriptions.

Technical Solution

One aspect of the present invention provides a sensing device including a sensing device including a stator connected to a first shaft, a first gear which rotates in conjunction with the stator, a second gear which rotates in conjunction with the first gear, a magnet coupled to the second gear, and a magnetic element disposed to correspond to the magnet, wherein one surface of the magnet disposed to face the magnetic element has an elliptical shape.

Another aspect of the present invention provides a sensing device including a sensing device including a stator connected to a first shaft, a first gear which rotates in conjunction with the stator, a second gear which rotates in conjunction with the first gear, a magnet coupled to the second gear, and a magnetic element disposed to correspond to the magnet, wherein one surface of the magnet disposed to face the magnetic element includes a flat surface and an inclined surface formed to be inclined with respect to the flat surface.

Still another aspect of the present invention provides a sensing device including a stator connected to a first shaft, a first gear which rotates in conjunction with the stator, a second gear which rotates in conjunction with the first gear, a magnet coupled to the second gear, and a magnetic element disposed to correspond to the magnet, wherein the magnet has a shape in which a difference between a maximum value of an X flux in an X direction and a maximum value of a Y flux in a Y direction has a value within 15% based on an offset of 1 mm.

With respect to a minor axis of the one surface, an S pole may be disposed in one region of the one surface, and an N pole may be disposed in the other region of the one surface.

The one surface of the magnet may include a flat surface and an inclined surface inclined with respect to the flat surface, wherein a corner at which the flat surface meets the inclined surface may be disposed to be parallel to the minor axis.

A boundary line between the one region and the other region may be disposed to overlap with the magnetic element in an axial direction of the second gear.

In addition, the inclined surface may be disposed to be inclined toward a center of the magnet.

The thickness of the peripheral region may decrease toward the central region.

One surface of the central region may include a flat surface, and one surface of the peripheral region may include an inclined surface. In this case, the other surface of the magnet may be a flat surface parallel to the flat surface of the central region.

A sensing point of the magnetic element may be disposed to overlap with the flat surface of the central region in an axial direction of the first gear.

One surface of the magnet may include one surface of the central region and one surface of the peripheral region and may be a surface facing the magnetic element.

A length of a flat surface of the central region may be in the range of 0.2 to 0.8 times a length of a major axis in a major axis direction of the magnet.

The magnet may include a body portion having the flat surface and a protrusion including the inclined surface, the flat surface may be disposed between two inclined surfaces, and the magnetic element may be disposed to overlap with an end portion of the protrusion in a radial direction of the second gear.

A part of the magnetic element may be disposed to overlap with the inclined surface in an axial direction.

A width of the magnetic element in a minor axis direction may be greater than a length of a minor axis (A2) of the magnet, and a width of the magnetic element in a major axis direction may be smaller than a length of a major axis (A1) of the magnet.

Yet another aspect of the present invention provides a sensing device including a stator connected to a first shaft, a first gear which rotates in conjunction with the stator, a second gear which rotates in conjunction with the first gear, a magnet coupled to the second gear, and a magnetic element disposed to correspond to the magnet, wherein one surface of the magnet disposed to face the magnetic element is formed in a shape having a major axis and a minor axis.

Advantageous Effects

A sensing device according to an embodiment can improve a degree of measurement accuracy of a steering angle due to a shape of a magnet even when an offset is generated when a center of the magnet disposed on a second gear and a center of a magnetic element are not aligned in an axial direction.

According to an embodiment, since one surface of a magnet disposed to face a magnetic element has a shape having a minor axis and a major axis which have different lengths, a degree of measurement accuracy of a steering angle can be improved. In this case, the minor axis can be defined as a virtual axis having a shortest length among virtual lines passing through a rotation center formed on one surface of the magnet, and the major axis can be defined as a virtual axis having a longest length among the virtual lines.

According to an embodiment, since an inclined surface is formed on one surface of a magnet disposed to face a magnetic element, a degree of measurement accuracy can be improved.

Various useful advantages and effects of the embodiments are not limited to the above-described contents and will be more easily understood from descriptions of the specific embodiments.

DESCRIPTION OF DRAWINGS

FIG. 1 is a perspective view illustrating a sensing device according to an embodiment.

FIG. 2 is a bottom perspective view illustrating the sensing device according to the embodiment.

FIG. 3 is an exploded perspective view illustrating the sensing device according to the embodiment.

FIG. 4 is a view illustrating an arrangement relationship between a magnet and a magnetic element which are disposed in the sensing device according to the embodiment.

FIG. 5 is a view illustrating an offset generated due to the arrangement relationship between the magnet and the magnetic element which are disposed in the sensing device according to the embodiment.

FIG. 6 is a graph showing a relationship between an X Flux in an X direction and a Y Flux in a Y direction of a magnet flux detected based on the magnetic element.

FIG. 7 is a view illustrating a magnet and a magnetic element as comparative examples.

FIG. 8 is a graph showing an X Flux and a Y Flux according to rotation of the magnet of the comparative example.

FIG. 9 is a graph showing nonlinearity of a flux due to an offset of the comparative example.

FIG. 10 is a graph showing an X Flux and a Y Flux according to the offset of the comparative example.

FIG. 11 is a graph showing maximum values of the X Flux and the Y Flux according to the offset of the comparative example.

FIG. 12 is a graph showing a relationship between the offset and the nonlinearity of the comparative example.

FIG. 13 is a perspective view illustrating a first example of the magnet disposed in the sensing device according to the embodiment.

FIG. 14 is a front view illustrating the first example of the magnet disposed in the sensing device according to the embodiment.

FIG. 15 is a plan view illustrating the first example of the magnet disposed in the sensing device according to the embodiment.

FIG. 16 is a bottom view illustrating the first example of the magnet disposed in the sensing device according to the embodiment.

FIG. 17 is a graph showing maximum values of an X Flux and a Y Flux according to an offset of the sensing device including the magnet according to the first example.

FIG. 18 is a graph showing a relationship between the offset and nonlinearity of the sensing device having the magnet according to the first example.

FIG. 19 is a perspective view illustrating a second example of a magnet disposed in a sensing device according to an embodiment.

FIG. 20 is a front view illustrating the second example of the magnet disposed in the sensing device according to the embodiment.

FIG. 21 is a graph showing maximum values of an X Flux and a Y Flux according to an offset of the sensing device including the magnet according to the second example, FIG. 22 is a graph showing a relationship between the offset and nonlinearity of the sensing device including the magnet according to the second example.

MODES OF THE INVENTION

Hereinafter, exemplary embodiments of the present invention will be described in detail with reference the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

A sensing device according to an embodiment may be disposed between an output shaft (not shown) and an input shaft (not shown) of steering shafts. In this case, the output shaft may be called a first shaft, and the input shaft may be called a second shaft.

FIG. 1 is a perspective view illustrating the sensing device according to the embodiment, FIG. 2 is a bottom perspective view illustrating the sensing device according to the embodiment, and FIG. 3 is an exploded perspective view illustrating the sensing device according to the embodiment. In this case, a Z direction shown in FIGS. 1 to 3 may denote an axial direction, and an R direction may denote a radial direction. In addition, the axial direction and the radial direction may be perpendicular to each other. In addition, a symbol "C" shown in FIGS. 1 to 3 may denote a rotation center of each of a rotor 100, a stator 200, and a first gear 300. In addition, a symbol "C1" shown in FIGS. 2 and 3 may denote a rotation center of each of a second gear 400 and a magnet 500. In addition, the symbols "C" and "C1" may be disposed parallel to each other in the axial direction.

Referring to FIGS. 1 to 3, a sensing device 1 according to the embodiment may include the rotor 100 connected to the second shaft which is the input shaft, the stator 200 connected to the output shaft which is the first shaft, the first gear 300 which rotates in conjunction with rotation of the stator 200, the second gear 400 which rotates in conjunction with rotation of the first gear 300, the magnet 500 coupled to the second gear 400, and a magnetic element 600 disposed to correspond to the magnet 500. In this case, the magnetic element 600 may be disposed on a circuit board 700 and may be referred to as a magnet sensing element. In addition, the first gear 300 may be called a main gear, and the second gear 400 may be called a sub-gear.

In this case, in the sensing device 1, an offset may be generated when centers of the magnet 500 disposed and the magnetic element 600 disposed on the second gear 400 are not aligned in the axial direction due to an assembly tolerance and the like. In this case, the assembly tolerance may be generated when the stator 200 and the first gear 300 are coupled, by a gear backlash generated when the first gear 300 and the second gear 400 are engaged, or when the circuit board 700 and a housing (not shown) are coupled. Accordingly, the offset may be generated due to the assembly tolerance and the like.

Accordingly, the sensing device 1 may prevent degradation of a degree of measurement accuracy of a steering angle using a shape of the magnet 500 even when the offset is generated. For example, as illustrated in FIG. 3, in the sensing device 1, one surface of the magnet 500 disposed to face the magnetic element 600 may be formed in an elliptical surface or an inclined surface may be formed on one surface to minimize an effect of the offset. That is, in the sensing device 1, a degree of measurement accuracy of the steering angle can be improved by minimizing the effect of the offset on a change in magnetic field detected by the magnetic element 600 using the shape of the magnet 500.

Meanwhile, the sensing device 1 according to the embodiment may also measure a torque of the steering shaft. Accordingly, the sensing device 1 may include a collector 800 and a torque sensor 900 disposed on the circuit board 700 to face one side of the collector 800.

In addition, the sensing device 1 may further include a housing (not shown) which forms an exterior and supports and protects each component.

The rotor 100 may be rotatably disposed inside the stator 200. In addition, the rotor 100 may be connected to the second shaft which is the input shaft of the steering shaft. In addition, the input shaft may be the steering shaft connected to a handle of a vehicle. In this case, the term "inward" refers to a direction toward a center C in the radial direction, and the term "outward" refers to a direction opposite to "inward."

The rotor 100 may include a yoke 110 having a cylindrical shape and a magnet 120 disposed on the yoke 110.

The yoke 110 may be coupled to the second shaft. Accordingly, the yoke 110 may rotate in conjunction with rotation of the second shaft.

The magnet 120 may be disposed outside the yoke 110. In this case, the magnet 120 may be fixedly adhered or press-fitted to an outer circumferential surface of the yoke 110. In addition, the magnet 120 may be called a rotor magnet or main magnet.

The stator 200 may be rotatably disposed outside the rotor 100. In addition, the stator 200 may be connected to the first shaft which is the output shaft.

Referring to FIG. 3, the stator 200 may include a holder 210 connected to the output shaft, a body 220 disposed at one side of an outer circumferential surface of the holder 210, and a pair of stator teeth 230 disposed on the body 220.

The holder 210 may be connected to the first shaft which is the output shaft of the steering shaft. Accordingly, the holder 210 may rotate in conjunction with rotation of the first shaft. In this case, the holder 210 may be formed of a metal material but is not necessarily limited thereto. For example, the holder 210 may be formed of another material having a predetermined strength so that the first shaft may be fixedly fitted to the holder 210.

The body 220 may be disposed on one end portion of the holder 210. For example, the body 220 may be disposed on one end portion of the holder 210 in an insert-injection manner using a resin such as a synthetic resin. In addition, the magnet 120 of the rotor 100 may be rotatably disposed on the body 220.

In addition, the body 220 may include a hole formed to be coupled to the stator teeth 230.

The stator teeth 230 may be fixedly coupled to the body 220. In this case, the stator teeth 230 may be formed in pair to be disposed on each of an upper portion and a lower portion of the body 220. In this case, the stator teeth 230 may be referred to as stator rings.

In addition, the stator teeth 230 may include a plurality of teeth 231 disposed to be spaced a distance from each other along an inner circumferential surface of the body 220, and the teeth 231 may be disposed to correspond to the magnet 120. For example, the teeth 231 may be disposed outside the magnet 120 in the radial direction.

The first gear 300 may be disposed to operate in conjunction with rotation of the stator 200. For example, the first gear 300 may be coupled to the body 220 of the stator 200 and rotated in conjunction with the rotation of the stator 200.

The first gear 300 may be formed in a ring shape, and a plurality of gear teeth may be formed on an outer circumferential surface of the first gear 300. In addition, the gear teeth of the first gear 300 may be engaged with gear teeth of the second gear 400.

The second gear 400 may rotate in conjunction with rotation of the first gear 300. For example, the second gear 400 may be engaged with the first gear 300. In this case, the second gear 400 may be disposed to have a rotation center C1 different from that of the first gear 300.

Referring to FIG. 3, the second gear 400 may include a second gear body 410 formed in a disc shape and a boss 420 protruding from the second gear body 410 in the axial direction. In this case, the boss 420 may be referred to as a first protrusion or a second gear protrusion.

The second gear body 410 may include gear teeth formed on an outer circumferential surface to be engaged with the gear teeth of the first gear 300.

The boss 420 may be formed in a cylindrical shape. In addition, the magnet 500 may be disposed inside the boss 420. Accordingly, the magnet 500 may also rotate in conjunction with rotation of the second gear 400. In this case, an example of the boss 420 formed in the cylindrical shape in which the magnet 500 is fixed is described, but the present invention is not necessarily limited thereto. For example, the boss 420 may be formed in any shape as long as the boss 420 can prevent movement of the magnet 500 and also be coupled to the magnet 500.

As illustrated in FIGS. 1 to 3, two second gears 400 may be disposed to improve a degree of measurement accuracy of the steering angle. Accordingly, the second gears 400 may include a 2-1 gear 400*a* and a 2-2 gear 400*b*. In this case, both the 2-1 gear 400*a* and the 2-2 gear 400*b* are disposed to be engaged with the first gear 300, but the present invention is not necessarily limited thereto. For example, the 2-1 gear 400*a* may also be engaged with the first gear 300, and the 2-2 gear 400*b* may also be disposed to be engaged with the 2-1 gear 400*a*.

The magnet 500 may be coupled to the second gear 400. Accordingly, the magnet 500 may share the rotation center C1 with the second gear 400 and rotate in conjunction with rotation of the second gear 400. For example, the magnet 500 may be coupled to the boss 420 of the second gear 400 and rotated with the second gear 400. In this case, the magnet 500 may be referred to as an angle magnet or a sub-magnet.

FIG. 4 is a view illustrating an arrangement relationship between the magnet and the magnetic element which are disposed in the sensing device according to the embodiment.

Referring to FIG. 4, when the magnet 500 and the magnetic element 600 are disposed so that the rotation center of the magnet 500 and the center of the magnetic element 600 are aligned in the axial direction, the steering angle can be accurately measured. For example, when the center of the magnetic element 600 is positioned on and aligned with the rotation center C1 of the magnet 500, the steering angle can be accurately measured FIG. 5 is a view illustrating an offset generated due to the arrangement relationship between the magnet and the magnetic element which are disposed in the sensing device according to the embodiment. In FIG. 5, a symbol "C2" may be the center of the magnetic element 600.

Referring to FIG. 5, the magnet 500 and the magnetic element 600 may be disposed such that the center of the magnet 500 disposed on the second gear 400 and the center of the magnetic element 600 are not aligned in the axial direction due to an assembly tolerance and the like.

For example, when "C1" denoting the rotation center of the magnet 500 and "C2" denoting the center of the magnetic element 600 are disposed in parallel in the axial direction, the offset may be generated between "C1" and "C2." That is, in a radial direction with respect to the rotation center C1 of the magnet 500, an offset may be generated between the rotation center C1 of the magnet 500 and a center C2 of the magnetic element 600.

Accordingly, in the sensing device 1, an effect due to the offset can be minimized due to the shape of the magnet 500 even when the offset is generated when the centers of the magnet 500 and the magnetic element 600 disposed on the second gear 400 are not aligned in the axial direction.

Accordingly, in order to check a difference in effect according to the shape of the magnet 500 of the sensing device 1 according to the embodiment, a comparative example of a magnet having a shape different from the shape of the magnet 500 may be proposed. In addition, an effect of the offset on a degree of measurement accuracy of the steering angle may also be checked using a flux detected by the magnetic element of the comparative example.

FIG. 6 is a graph showing a relationship between an X Flux in an X direction and a Y Flux in a Y direction of a magnet flux detected based on the magnetic element, FIG. 7 is a view illustrating the magnet and the magnetic element as the comparative examples. FIG. 8 is a graph showing an X Flux and a Y Flux according to rotation of the magnet of the comparative example, and FIG. 9 is a graph showing nonlinearity of a flux due to an offset of the comparative example. In FIG. 6, the X direction and the Y direction on a plane may be perpendicular to each other. In addition, a symbol "P" shown in FIG. 6 may be disposed on line C2 passing through a center of the magnetic element.

Referring to FIG. 6, a magnet flux detected by the magnetic element may be divided into an X Flux X in the X direction and a Y Flux in the Y direction. In this case, an arctangent Atan may be calculated for calculating an angle, and an error in calculating the angle may occur due to a difference in maximum value between the X Flux and the Y Flux due to an offset. Accordingly, nonlinearity presented in association with a degree of measurement accuracy of a steering angle occurs. In this case, the center of the magnetic element may be a center of sensing and may be called a sensing point P. In this case, the magnetic element may be a Hall integrated circuit (IC).

Referring to FIG. 7, a sensing device as the comparative example may include a magnetic element 10, a sub-gear 20, and a magnet 30 fixed to the sub-gear 20 and disposed to face the magnetic element 10. In this case, the magnetic element 10 and the magnet 30 may generate a certain offset due to an assembly tolerance and the like.

In this case, the magnet 30 of the sensing device as the comparative example may be formed in a cylindrical shape, and one surface 31 of the magnet 30 disposed to face the magnetic element 10 may be formed in a circular shape having a predetermined radius r. Accordingly, when the offset occurs, the sensing device as the comparative example has difficulty in responding to the offset.

Referring to FIG. 8, with respect to a virtual line passing through a center C1, an S pole may be disposed at one side of the magnet 30, and an N pole may be disposed at the other side. In this case, the sensing point P of the magnetic element 10 may be disposed on one surface 31 of the magnet 30 to be spaced a certain distance from a rotation center C1 of the magnet 30 due to the offset. As illustrated in FIG. 8, actual measurement values of the X Flux and the Y Flux may be expressed as waveforms according to a rotation angle of the magnet 30.

When the actual measurement values of the X Flux and the Y Flux are compared with ideal values with reference to FIG. 8, differences may occur between the actual measurement values and the ideal values due to the offset. For example, at 45 degrees of FIG. 8, it can be seen that differences occur between the actual measurement values of the X Flux and the Y Flux and the ideal values. In this case, the actual measurement values may be values, which reflect the offset and are actually measured by the magnetic element, and the ideal values may be theoretical values calculated when the center of the magnet and a center of the magnetic element are aligned.

Accordingly, when the steering angle is measured using the sensing device, the offset affects the degree of accuracy. The effect can be seen more clearly with reference to FIG. 9.

FIG. 9 is a view showing a comparison between an actual measurement value of a flux due to an offset of the comparative example and an ideal value to check a degree of measurement accuracy of a steering angle, and an ideal value may be expressed in a linear shape. In addition, a difference between the actual measurement value and the ideal value may be expressed in a nonlinear shape (waveform) and may be called nonlinearity. In this case, the nonlinearity may be expressed in units of angles.

Referring to FIG. 9, it can be seen that the nonlinearity of the actual measurement value due to the offset increases due to the difference from the ideal value. In this case, the nonlinearity may be expressed as a maximum value of the difference between the ideal value and the actual measurement value. Accordingly, a value at a point farthest from the ideal value may be provided as a nonlinearity value, and when a rotation angle of the magnet 30 is 45 degrees, 135 degrees, 225 degrees, or 315 degrees, the nonlinearity value may have a maximum value.

Accordingly, it can be seen that a degree of measurement accuracy of the steering angle due to the offset relates to the nonlinearity. For example, it can be seen that, as the nonlinearity value is increased, the degree of measurement accuracy of the steering angle is degraded.

Meanwhile, due to various factors such as accumulation of assembly tolerances and the like, a length of the offset may be changed. Accordingly, an effect of an increase in offset on the degree of measurement accuracy will be described with reference to the comparative examples illustrated in FIG. 7.

FIG. 10 is a graph showing an X Flux and a Y Flux according to the offset of the comparative example, FIG. 11 is a graph showing maximum values of the X Flux and the Y Flux according to the offset of the comparative example, and FIG. 12 is a graph showing a relationship between the offset and the nonlinearity of the comparative example.

Referring to FIG. 10, it can be seen that, as the offset increases in the sensing device according to the comparative example, the maximum value of the Y Flux also increases. Accordingly, it can be seen at around 45 degrees of FIG. 10 that a difference between the X Flux and the Y Flux also increases.

Referring to FIG. 11, the difference between the X Flux and the Y Flux can be further clarified through a difference in maximum value between the X Flux and the Y Flux. As illustrated in FIG. 11, it can be seen that, as the offset increases, the difference in maximum value between the X Flux and the Y Flux also increases.

Referring to FIG. 12, it can be seen that, as the offset increases, the nonlinearity increases sharply. For example, it can be seen that, when the offset is about 0.5 mm, the nonlinearity value is about 2.6 degrees. Accordingly, as the offset increases, a degree of measurement accuracy of the steering angle is also lowered.

Accordingly, as the offset increases, the difference in maximum value between the X Flux and the Y Flux increases, and thus the nonlinearity also increases. Accordingly, it can be seen that, as the offset increases, the degree of measurement accuracy of the steering angle is lowered.

Accordingly, in the sensing device 1 according to the embodiment, the magnet 500 which minimizes an effect of the offset is provided, and thus a degree of measurement accuracy of the steering angle above a predetermined level can be provided.

FIG. 13 is a perspective view illustrating a first example of the magnet disposed in the sensing device according to the embodiment, FIG. 14 is a front view illustrating the first example of the magnet disposed in the sensing device according to the embodiment, FIG. 15 is a plan view illustrating the first example of the magnet disposed in the sensing device according to the embodiment, and FIG. 16 is a bottom view illustrating the first example of the magnet disposed in the sensing device according to the embodiment.

Referring to FIGS. 13 to 16, the magnet 500 may include a facing surface 510 which is one surface disposed to face the magnetic element 600. In addition, the magnet 500 may include a lower surface 540 which is an opposite surface of the facing surface 510 in the axial direction.

The facing surface 510 may be formed in a shape having a major axis A1 and a minor axis A2. For example, the facing surface 510 may be formed in an elliptical shape or a polygonal shape having five or more angles. Even when the facing surface 510 is formed in the polygonal shape, the facing surface 510 may be formed to have the major axis A1 and the minor axis A2. In this case, the minor axis A2 may be defined as a segment having a shortest length among segments which pass through the rotation center C1 and connect two points on a circumference of the magnet 500, and the major axis A1 may be defined as a segment having a longest length among the segments.

In addition, the minor axis A2 may be a boundary line B dividing one region in which an S pole is disposed from the other region in which an N pole is disposed. Accordingly, with respect to the minor axis A2, one region in which the S pole is implemented may be disposed at one side, and the other region in which the N pole is disposed may be disposed at the other side. In this case, the boundary line B may be disposed to overlap with the magnetic element 600 in the axial direction of the second gear 400. In addition, for overlapping of the boundary line B and the magnetic element 600 in consideration of the offset, a width of the magnetic element 600 in the radial direction may be greater than a length of the minor axis A2.

Meanwhile, since the magnet 500 may include a body portion 520 and a protrusion 530 formed to protrude from one side of the body portion 520 in the axial direction, the facing surface 510 may include a flat surface 511 and an inclined surface 512 obliquely disposed at a predetermined angle θ with respect to the flat surface 511. In this case, the protrusion 530 of the magnet 500 may be referred to as a second protrusion or magnet protrusion.

The body portion 520 and the protrusion 530 may be integrally formed, the flat surface 511 may be one surface at one side of the body portion 520 in the axial direction, and the inclined surface 512 may be one surface of the protrusion 530 in the axial direction. In this case, a part of flat surface 511 and a part of the inclined surface 512 may be disposed to face the magnetic element 600.

Referring to FIGS. 13 to 15, the flat surface 511 may be disposed between two inclined surfaces 512.

In addition, the rotation center C1 of the magnet 500 may be positioned on the flat surface 511. Accordingly, the minor axis A2 may also be disposed on the flat surface 511, and a corner 513 at which the flat surface 511 meets the inclined surface 522 may be disposed to be parallel to the minor axis. In this case, the corner 513 may be disposed to overlap with the magnetic element 600 in the axial direction.

In addition, the flat surface 511 may be formed to have a predetermined area. In this case, the area of the flat surface 511 may be determined during designing of the magnet 500 so that the sensing point P of the magnetic element 600 can overlap with the flat surface 511 in the axial direction.

That is, the area of the flat surface 511 may be determined in consideration of an assembly tolerance, a range of the offset which may be generated due to the assembly tolerance, and overlapping of the magnetic element 600 in the axial direction. For example, the area of the flat surface 511 may be smaller than an area of one surface of the magnetic element 600 disposed to face the flat surface 511. Accordingly, each of a width of the flat surface 511 in a major axis direction and a width of the flat surface 511 in a minor axis direction may be smaller than a width of one surface of the magnetic element 600. Specifically, the width of the flat surface 511 in the major axis direction may be smaller than a length of one surface of the magnetic element 600 in a diagonal direction.

In addition, as the flat surface 511 is formed to have the predetermined area, the flat surface 511 has a predetermined length in the major axis direction. In this case, based on the major axis direction of the magnet 500, a length L1 of the flat surface 511 in the major axis direction may be formed in the range of 0.2 to 0.8 times a length L2 of the major axis A1. That is, the length L1 of a central region of the flat surface 511 may be in the range of 0.2 to 0.8 times the length L2 of the major axis A1 of the magnet 500.

Meanwhile, since the rotation center C1 of the magnet 500 is positioned on the flat surface 511, and the flat surface 511 is disposed between the inclined surfaces 512, the flat surface 511 may be provided as one surface of a central region of the magnet 500. In this case, a center of the flat surface 511 may be coaxially disposed with the rotation center C1 of the magnet 500.

That is, the magnet 500 may include the central region in which the flat surface 511 is disposed and a peripheral region in which the inclined surface 512 is disposed, and the flat surface 511 may be provided as a reference for distinguishing the central region from the peripheral region. Accordingly, the central region may include the flat surface 511 as one surface, and the peripheral region may include the inclined surface 512 as one surface.

Two inclined surfaces 512 may be disposed at one side and the other side of the flat surface 511 in the major axis direction.

In addition, the inclined surface 512 may be disposed to have a predetermined gap G from a lower edge of the magnetic element 600. Accordingly, when the magnet 500 is rotated, interference between the inclined surface 512 and the magnetic element 600 can be prevented.

In addition, the inclined surface 512 may be obliquely disposed at a predetermined angle θ with respect to the flat surface 511 and obliquely disposed toward the center C1 of the magnet 500. In this case, the larger the angle θ, the more advantageous in terms of a degree of accuracy, but the angle θ may be formed in the range in which the gap G is formed.

In addition, the inclined surface 512 may be provided as one surface of the peripheral region. Accordingly, due to the inclined surface 512, a thickness of the magnet 500 in the axial direction may increase away from the center C1 of the magnet 500.

The body portion 520 may be formed in a column shape having the major axis A1 and the minor axis A2. For example, the body portion 520 may be formed in an elliptical column shape. In this case, the flat surface 511 may be provided as one surface of the body portion 520.

In addition, the body portion 520 may be formed to have a predetermined thickness T1 in the axial direction. In this case, the thickness T1 of the body portion 520 in the axial direction may be called a first thickness and may be a thickness of the central region.

The protrusion 530 may be formed to protrude in the axial direction from one surface of the body portion 520 having the flat surface 511.

In addition, two protrusions 530 may be disposed on one surface of the body portion 520 to be spaced apart from each other and may be symmetrically disposed with respect to the minor axis A2.

In addition, the protrusion 530 may be formed to have a predetermined thickness T2 in the axial direction. In this case, the thickness T2 of the protrusion 530 in the axial direction may be called a second thickness and may be a thickness of the peripheral region. Accordingly, the thickness of the peripheral region may be greater than the thickness of the central region in the axial direction.

In addition, the protrusion 530 may include the inclined surface 512. Accordingly, the thickness of the peripheral region may decrease toward the central region.

In addition, an end portion of the protrusion 530 on which the inclined surface 512 is formed may be disposed to overlap with a lower side of the magnetic element 600 in the radial direction of the second gear 400. In this case, a partial region of the magnetic element 600 may be disposed to overlap with the inclined surface 512 in the axial direction of the second gear 400. Accordingly, the corner 513 may be disposed to overlap with the magnetic element 600 in the axial direction.

The lower surface 540 may be the other surface positioned at an opposite side of the facing surface 510 which is one surface of the magnet 500 in the axial direction. In addition, the lower surface 540 may be provided as a flat surface parallel to the flat surface 511 of the central region.

FIG. 17 is a graph showing maximum values of an X Flux and a Y Flux according to an offset of the sensing device including the magnet according to the first example, and FIG. 18 is a graph showing a relationship between the offset and nonlinearity of the sensing device having the magnet according to the first example.

Referring to FIGS. 5 and 17, it can be seen that, as the offset generated between the magnet 500 and the magnetic element 600 of the sensing device 1 according to the embodiment increases, a difference in maximum value between the X Flux and the Y Flux detected by the magnetic element 600 also increases.

However, when the difference in maximum value between the X Flux and the Y Flux according to the offset of the comparative examples illustrated in FIG. 11, it can be seen that the difference in maximum value between the X Flux and the Y Flux detected by the sensing device 1 according to the embodiment is smaller than that according to the comparison example. For example, when the offset of the comparative examples is 1.00 mm, the difference in maximum value between the X Flux and the Y Flux is about 8 mT. In addition, when the offset of the sensing device 1 is 1.00 mm, the difference in maximum value between the X Flux and the Y Flux is about 1.8 mT.

Referring to FIG. 18, it can be seen that, as the offset of sensing device 1 according to the embodiment increases, the nonlinearity increases.

When the nonlinearity of sensing device 1 according to the embodiment and that of the comparative example are compared with reference to FIGS. 12 and 18, it can be seen that a line indicating the nonlinearity of the sensing device 1 according to the embodiment rises gently as compared to a line indicating the nonlinearity of the comparative example. For example, it can be seen that the nonlinearity value is about 0.8 degrees when the offset of the sensing device 1 is about 0.5 mm. Accordingly, in the case of the sensing device 1, it can be seen that, as the offset increases, a degree of measurement accuracy of the steering angle is higher than that of the comparison example.

However, in the case of the sensing device 1, in consideration of a relationship with the nonlinearity, a ratio for the difference in maximum value between the X Flux and the Y Flux may be limited. In this case, the ratio for the difference in maximum value between the X Flux and the Y Flux may be obtained using an equation below $$\text{Ratio} = \left( \frac{Y\ \text{Flux} - \text{Flux}}{Y\ \text{Flux}} \right) \times 100\% \qquad \text{[Equation]}$$

Accordingly, the magnet 500 of the sensing device 1 may be formed so that the ratio for the difference in maximum value between the X Flux and the Y Flux based on the offset of 1 mm has a value within 15%. When the ratio for the difference is greater than 15%, the nonlinearity increases, and thus it is difficult to provide a degree of measurement accuracy of the steering angle above a predetermined level. The limit of the ratio may also be applied to a sensing device 1 including a magnet 500a according to a second example described below.

To sum up, since the shape of the magnet 500 of the sensing device 1 minimizes the effect of the offset, the sensing device 1 can detect the steering angle with a higher degree of measurement accuracy than that of the comparative example. Accordingly, the sensing device 1 can improve reliability by providing the degree of measurement accuracy of the steering angle above the predetermined level even when the offset is generated.

FIG. 19 is a perspective view illustrating a second example of a magnet disposed in a sensing device according to an embodiment, FIG. 20 is a front view illustrating the second example of the magnet disposed in the sensing device according to the embodiment, FIG. 21 is a graph showing maximum values of an X Flux and a Y Flux according to an offset of the sensing device including the magnet according to the second example, and FIG. 22 is a graph showing a relationship between the offset and nonlinearity of the sensing device including the magnet according to the second example.

A magnet 500a according to the second example may be disposed in a sensing device 1 instead of the magnet 500 according to the first example.

When the magnet 500 according to the first example is compared with the magnet 500a according to the second example with reference to FIGS. 13 to 16, 19, and 20, the magnet 500a according to the second example is different from the magnet 500 according to the first example in a point of not including the protrusion 530 of the magnet 500 according to the first example. That is, a shape of a facing surface, which is one surface disposed to face a magnetic element 600, of the magnet 500a according to the second example is different from that of the magnet 500 according to the first example.

Referring to FIGS. 19 and 20, the magnet 500a may include a facing surface 510a which is one surface disposed to face the magnetic element 600. In addition, the magnet 500a may include a lower surface 540 which is an opposite surface of the facing surface 510a in an axial direction.

The facing surface 510a may be formed in a shape having a major axis A1 and a minor axis A2. For example, the facing surface 510a may be formed in an elliptical shape and may be provided as a flat surface.

The facing surface 510 may be one surface of the magnet 500 in the axial direction, and the lower surface 540 may be the other surface positioned at an opposite side of the facing surface 510. In addition, the lower surface 540 may be provided as a flat surface parallel to a flat surface 511 of a central region and may be formed in the same shape as the facing surface 510a.

Referring to FIG. 21, it can be seen that, as an offset generated between the magnet 500a and the magnetic element 600 of the sensing device 1 according to the embodiment increases, a difference in maximum value between an X Flux and a Y Flux detected by the magnetic element 600 also increases.

When nonlinearity of the sensing device 1 including the magnet 500a according to the second example is compared with that of the comparative example with reference to FIGS. 12 and 22, it can be seen that a line indicating the nonlinearity of the sensing device 1 according to the embodiment rises gently as compared to the line indicating the nonlinearity of the comparative example. For example, it can be seen that a nonlinearity value is about 2.0 degrees when the offset of the sensing device 1 including the magnet 500a according to the second example is about 0.5 mm. Accordingly, in the case of the sensing device 1 including the magnet 500a according to the second example, it can be seen that, as the offset increases, a degree of measurement accuracy of a steering angle is higher than that of the comparative example.

The magnetic element 600 may be disposed to correspond to the magnet 500 to detect a change in magnetic field of the magnet 500. For example, one surface of the magnetic element 600 may be disposed to face the facing surface 510 of the magnet 500. In this case, the sensing point P of the magnetic element 600 may be disposed to overlap with the flat surface 511 in the axial direction. In this case, the magnetic element 600 may be referred to as a magnet sensing device, and a Hall IC may be used as the magnetic element 600. In addition, one surface of the magnetic element 600 disposed to face the facing surface 510 of the magnet 500 may be called a detection surface.

In this case, the same number of magnetic elements 600 as magnets 500 or 500a may be disposed on the circuit board 700.

In addition, the width of one surface of the magnetic element 600 may be greater than the length of the minor axis A2 and smaller than the length of the major axis A1. For example, a width of the magnetic element 600 in the minor axis direction may be greater than the length of the minor axis A2 of the magnet 500, and a width of the magnetic element 600 in the major axis direction may be smaller than the length of the major axis A1.

In addition, the magnetic element 600 may be disposed between the protrusions 530 in the radial direction of the second gear 400. For example, since the width of one surface of the magnetic element 600 is smaller than the length of the major axis A1, and the inclined surfaces 512 are formed on the protrusions 530, the magnetic element 600 may be disposed between the protrusions 530 in the radial direction of the second gear 400. That is, the magnetic element 600 may be disposed between the inclined surfaces 512 in the radial direction of the second gear 400, and a partial region of the magnetic element 600 may be disposed to overlap with the inclined surfaces 512 in the axial direction. However, when the magnet 500 is rotated, the magnetic element 600 should be disposed to have the predetermined gap G from the inclined surface 512 so that interference between the inclined surface 512 and the magnetic element 600 can be prevented.

The magnetic element 600 which detects magnetization of the magnet 500 may be disposed on the circuit board 700. In addition, a torque sensor 900 for measuring a torque may be disposed on the circuit board 700. In this case, the circuit board 700 may be a printed circuit board.

In addition, the circuit board 700 may be formed in an arc shape and may be disposed outside the body 220 of the stator 200.

The collector 800 allows the torque sensor 900 disposed on the circuit board 700 to detect a change in magnetic force caused by a difference in rotation according to torsion of the input shaft and the output shaft. In this case, the collector 800 may be formed of a metal material and fixed to the housing.

Two collectors 800 may be disposed to correspond to each of the pair of stator teeth 230 to collect a flux of the stator 200. In this case, the collector 800 may be divided into an upper collector and a lower collector according to arrangement positions.

Referring to FIGS. 1 to 3, the collectors 800 may be disposed close to the stator teeth 230. In this case, the term "close" may denote the term "in contact with or spaced a predetermined distance from each other."

The collector 800 may include a plate 810 and a leg 820.

The plate 810 may be formed in a plate shape. In addition, the plate 810 may be disposed close to one side of each of the stator teeth 230.

The leg 820 may be formed to protrude from the plate 810 in the axial direction. In this case, the leg 820 may be disposed outside the body 220, and an end portion of the leg 820 may be bent in the radial direction.

In addition, the end portion of the leg 820 may be disposed to face the torque sensor 900. Accordingly, the torque sensor 900 may be disposed between legs 820 of the upper collector and the lower collector.

The torque sensor 900 may be disposed on the circuit board 700. In this case, the torque sensor 900 may be disposed to correspond to the leg 820 of the collector 800.

As the torsion occurs between the input shaft and the output shaft, a difference in rotation between the rotor 100 and the stator 200 may occur. In addition, the difference in rotation is detected as a change in magnetic force by the collector 800 and the torque sensor 900. Accordingly, the torque sensor 900 can measure a torque to smoothly adjust a steering handle.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS

1: SENSING DEVICE
100: ROTOR
200: STATOR
300: FIRST GEAR
400: SECOND GEAR
500, 500A: MAGNET
510: FACING SURFACE
511: FLAT SURFACE
512: INCLINED SURFACE
600: MAGNETIC ELEMENT
700: CIRCUIT BOARD
800: COLLECTOR
900: TORQUE SENSOR

The invention claimed is:

1. A sensing device comprising:
a stator connected to a first shaft;
a first gear which rotates in conjunction with the stator;
a second gear which rotates in conjunction with the first gear;
a magnet coupled to the second gear; and
a magnetic element disposed to correspond to the magnet,
wherein one surface of the magnet has an elliptical shape,
wherein the magnet has a peripheral region of which a thickness is greater than a thickness of a central region of the magnet in an axial direction,
wherein one surface of the central region includes a flat surface, and
wherein one surface of the peripheral region includes an inclined surface.

2. The sensing device of claim 1, wherein, with respect to a minor axis of the one surface:
an S pole is disposed in one region of the one surface; and
an N pole is disposed in an other region of the one surface.

3. The sensing device of claim 2,
wherein a corner at which the flat surface meets the inclined surface is disposed to be parallel to the minor axis.

4. The sensing device of claim 2, wherein a boundary line between the one region and the other region overlaps with the magnetic element in an axial direction of the second gear.

5. The sensing device of claim 1, wherein the thickness of the peripheral region decreases toward the central region.

6. The sensing device of claim 1, wherein an other surface of the magnet, opposite to the one surface, is a flat surface parallel to the flat surface of the central region.

7. The sensing device of claim 1, wherein a sensing point of the magnetic element is disposed to overlap with the flat surface of the central region in an axial direction of the first gear.

8. The sensing device of claim 1, wherein one surface of the magnet is a surface facing the magnetic element.

9. The sensing device of claim 1, wherein a length of the flat surface of the central region is in the range of 0.2 to 0.8 times a length of a major axis in a major axis direction of the magnet.

10. The sensing device of claim 1, wherein a width of the magnetic element in a minor axis direction is greater than a length of a minor axis (A2) of the magnet, and wherein a width of the magnetic element in a major axis direction is smaller than a length of a major axis (A1) of the magnet.

11. A sensing device comprising:

a stator connected to a first shaft;

a first gear which rotates in conjunction with the stator;

a second gear which rotates in conjunction with the first gear;

a magnet coupled to the second gear; and a magnetic element disposed to correspond to the magnet, wherein one surface of the magnet includes a flat surface and an inclined surface inclined with respect to the flat surface, wherein the magnet includes a body portion having the flat surface and a protrusion including the inclined surface, wherein the flat surface is disposed between two inclined surfaces, and wherein the magnetic element is disposed to overlap with an end portion of the protrusion in a radial direction of the second gear.

12. The sensing device of claim 11, wherein the inclined surface is inclined toward a center of the magnet.

13. The sensing device of claim 11, wherein a part of the magnetic element is disposed to overlap with the inclined surface in an axial direction.

14. A sensing device comprising:

a stator connected to a first shaft;

a first gear which rotates in conjunction with the stator;

a second gear which rotates in conjunction with the first gear;

a magnet coupled to the second gear; and a magnetic element disposed to correspond to the magnet, wherein the magnet has a shape in which a ratio for a difference between a maximum value of an X flux and a maximum value of a Y flux has a value within 15% based on an offset of 1 mm, wherein the magnet has a peripheral region of which a thickness is greater than a thickness of a central region of the magnet in an axial direction, wherein one surface of the central region includes a flat surface, and wherein one surface of the peripheral region includes an inclined surface.

* * * * *